J. H. MacMAHON.
METHOD OF PRODUCING CARBONATES OF THE ALKALINE EARTH METALS.
APPLICATION FILED FEB. 19, 1920.
1,378,595.
Patented May 17, 1921.
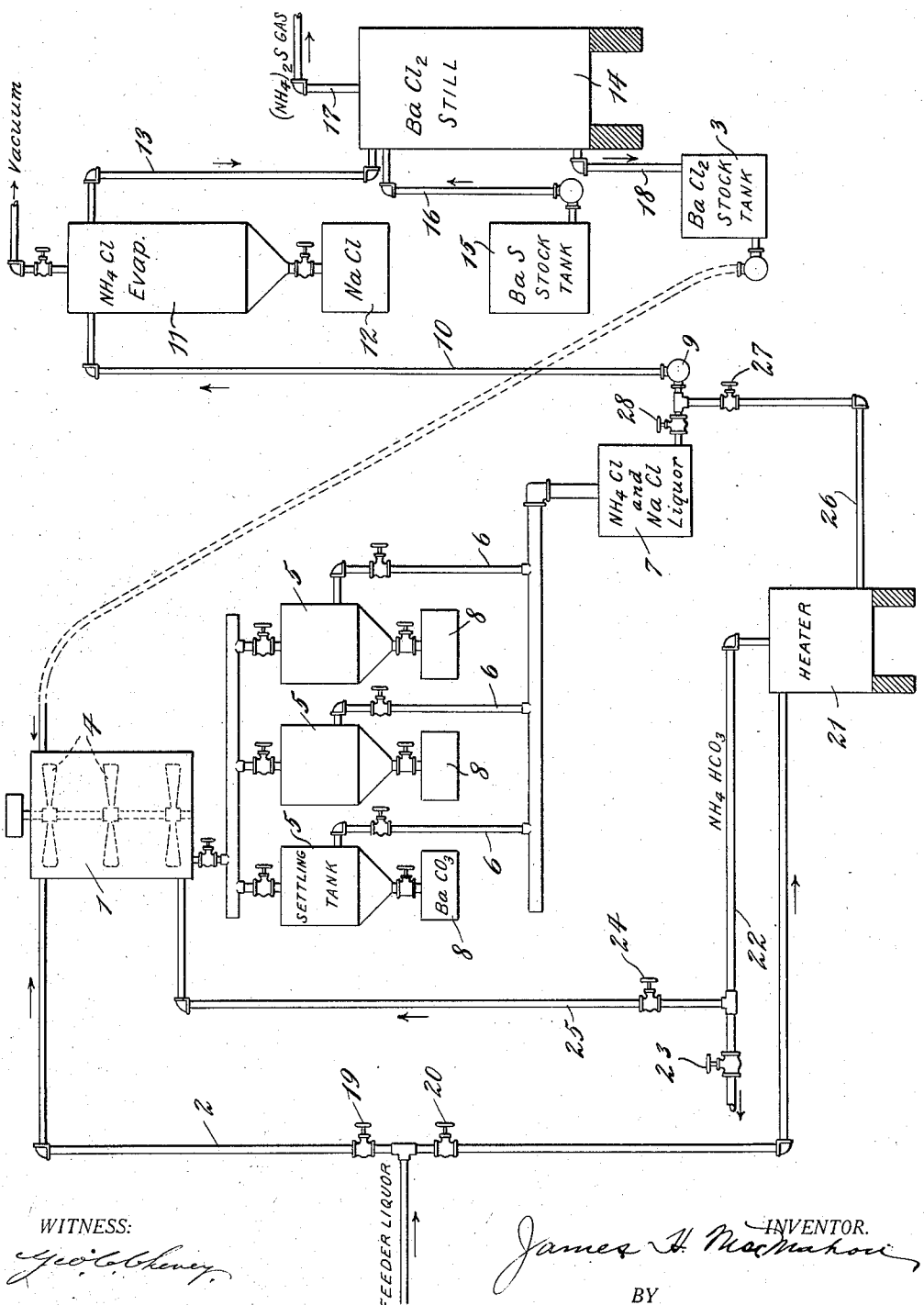
WITNESS:
INVENTOR.
James H. MacMahon
BY
Rosenbaum, Stockbridge & Borst
ATTORNEY.

UNITED STATES PATENT OFFICE.

JAMES H. MacMAHON, OF SALTVILLE, VIRGINIA, ASSIGNOR TO THE MATHIESON ALKALI WORKS, INC., A CORPORATION OF VIRGINIA.

METHOD OF PRODUCING CARBONATES OF THE ALKALINE-EARTH METALS.

1,378,595.  Specification of Letters Patent.  Patented May 17, 1921.

Application filed February 19, 1920. Serial No. 359,891.

*To all whom it may concern:*

Be it known that I, JAMES H. MACMAHON, a citizen of the United States, residing at Saltville, in the county of Smyth and State of Virginia, have invented certain new and useful Improvements in Methods of Producing Carbonates of the Alkaline-Earth Metals, of which the following is a full, clear, and exact description.

An object of my invention is to produce a high grade of carbonate of the alkaline earth metals at comparatively low cost. Such carbonates are usually prepared by precipitating a solution of a salt of an alkaline earth metal with an alkaline carbonate, such as a solution of soda ash. By my method the cost of the soda ash is saved which materially reduces the cost of the carbonate of the alkaline earth metal.

I have discovered that a carbonate of an alkaline earth metal will be precipitated by a reaction between a salt of the alkaline earth metal and ammonium bicarbonate. For the purpose of explaining my invention I shall refer to barium as the alkaline earth metal the carbonate of which is produced, it being understood that my method comprehends the production of the carbonate of the other alkaline earth metals. If ammonium bicarbonate is caused to react with barium sulfid in solution, barium carbonate is precipitated, the ammonia being converted into an acid sulfid, in accordance with the following reaction:

(1)  $BaS+NH_4HCO_3 = BaCO_3+NH_4HS$.

If ammonium bicarbonate is caused to react with barium chlorid in solution, barium carbonate is precipitated, the ammonia being converted into ammonium chlorid according to the following reaction:

(2) 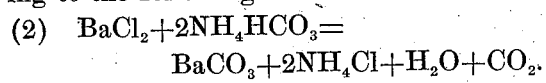 $BaCl_2+2NH_4HCO_3 = BaCO_3+2NH_4Cl+H_2O+CO_2$.

The latter reaction may be employed with especial advantage to treat the ammonium bicarbonate content of the feeder liquor coming from the sodium bicarbonate filters of the ammonia soda process, both because of the large available supply of this liquor and also because the ammonium salt resulting from the reaction is identical with that already in the liquor and forming the chief content thereof, and therefore the same treatment will liberate all the ammonia in the feeder liquor which is thus recovered to be returned to the ammonia soda process.

One way in which my method may be carried out is to supply ammonium bicarbonate and barium chlorid solutions in proper proportions to a suitable tank fitted with a mechanical agitator for mixing the reagents. The liquor from this tank containing the precipitated barium carbonate may be pumped to settling tanks where the carbonate is allowed to settle, the clear liquor then being decanted from it, after which the barium carbonate is washed and dried.

The barium chlorid may be obtained by reacting upon a solution of ammonium chlorid with a solution of barium sulfid obtained by lixiviation of the black ash of barytes. This reaction is as follows:

(3) 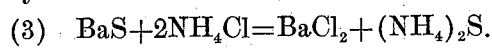 $BaS+2NH_4Cl = BaCl_2+(NH_4)_2S$.

When employed in connection with the feeder liquor of the ammonia soda process, it will therefore be understood that the process may be a continuous one after once it has been initiated, the barium chlorid which is formed, or so much of it as is necessary, being used as the reagent with the ammonium bicarbonate to precipitate barium carbonate. The feeder liquor which contains ammonium bicarbonate, ammonium chlorid and sodium chlorid in solution, is delivered to the mixing tank for reaction with the barium chlorid, and after the precipitated barium carbonate has been removed the ammonium chlorid liquor is delivered to a still for treatment with the barium sulfid liquor, the sodium chlorid preferably being first separated out by concentrating sufficiently to throw the sodium chlorid out of solution. The solution of barium chlorid thus formed is pumped to the mixing tank for treatment of more feeder liquor.

In initiating the process the feeder liquor may at first be delivered to the usual heater where the volatile ammonium bicarbonate will be driven off and returned to the ammonium soda process, while the ammonium chlorid liquor is delivered to the still for reaction with barium sulfid to form barium chlorid. After sufficient barium chlorid has thus been formed to start the process, the feeder liquor will be delivered direct to the mixing tank instead of to the heater, and the barium chlorid formed thereafter will be ample for reaction with the feeder liquor delivered to the mixing tank.

Instead of delivering the feeder liquor to the mixing tank, reaction number 2 may be caused by passing the distilled ammonium bicarbonate from the heater into a solution of barium chlorid, and the precipitated barium carbonate will be settled out in the manner above described, the ammonium chlorid liquor being available for treatment to recover the ammonia therefrom.

In the accompanying drawing, I have shown diagrammatically an apparatus suitable for carrying out the continuous process above referred to when my invention is employed in connection with the feeder liquor of the ammonium soda process.

Feeder liquor from the sodium bicarbonate filters is delivered to the mixing tank 1 through pipe 2, and the barium chlorid solution is pumped into the mixing tank from the stock tank 3, the proportion between the two liquors being properly regulated. The two solutions are thoroughly mixed and agitated by suitable mechanism 4 within the tank driven from outside the tank, as indicated. After reaction number 2 is completed, the liquor which contains, in addition to the precipitate, ammonium chlorid and a smaller amount of sodium chlorid in solution, is drawn into a settling tank 5 of which there are preferably a plurality in order that the process may be continued without interruption. After the precipitate has settled out, the ammonium chlorid liquor is decanted off through pipe 6 and thence delivered into a suitable stock tank 7. The precipitate can be drawn off into suitable receptacles 8 and then washed and dried, the washings being preferably delivered to the stock tank 7.

From stock tank 7 the liquor is pumped to a suitable receptacle, for treatment with barium sulfid to produce barium chlorid according to reaction number 3. I preferably separate out the sodium chlorid from the liquor before treatment with barium sulfid because of the difficulty of separating barium chlorid and sodium chlorid, and this is contemplated with the illustrated apparatus. The pump 9 delivers the liquor from stock tank 7 through conduit 10 to the top of an evaporator 11 where the solution is concentrated until practically all of the sodium chlorid is thrown out of solution, which is then drawn from the bottom of the evaporator to a centrifugal machine 12 where the salt is washed and dried, the weak liquor from this machine going back again to the evaporator 11. The strong ammonium chlorid liquor overflows through conduit 13, and, if desired, the ammonium chlorid may be crystallized out and a strong solution made of these crystals for treatment with barium sulfid thereby obtaining practically a pure solution, or the ammonium chlorid liquor may be delivered direct through pipe 13 to the top of a still 14 where the reaction producing barium chlorid is effected.

Barium sulfid will preferably be obtained by lixiviation of the black ash of barytes, the clear concentrated solution being stored in the stock tank 15. From this tank it is pumped through conduit 16 into the top of the still 14. Exhaust steam enters the bottom of the still which heats the liquor passing down the still. The ammonium sulfid passes off as a gas from the liquor through conduit 17.

The solution of barium chlorid formed by this reaction is withdrawn from the bottom of the still through conduit 18 and stored in stock tank 3. From here it is pumped in such quantities as needed to the top of the mixing tank 1 as above described, the excess being concentrated and crystallized.

In order to produce an initial supply of barium chlorid with which to start the process, the feeder liquor may at first be heated to drive off the volatile ammonium bicarbonate, the resulting ammonium chlorid liquor being treated with barium sulfid. In order to accomplish this the valve 19 in pipe 2 will be closed and the valve 20 will be opened, whereupon the feeder liquor will be delivered to the heater section 21, the volatile ammonium bicarbonate being driven off through conduit 22 and returned to the ammonia soda process, the valve 23 being opened for this purpose, while the valve 24 in branch pipe 25 is closed. The bottom of heater 21 communicates through pipe 26 with the pump 9, a valve 27 being arranged in control of this communication. During this initial operation the valve 27 will be open, while valve 28 in control of a communication between the stock tank 7 and the pump 9 will be closed. Under these conditions, the ammonium chlorid liquor from the heater will be pumped through conduits 26 and 10, delivered to the evaporator 11 and subsequently treated in the manner above described. When a supply of barium chlorid solution has thus been obtained, the feeder liquor is diverted from the heater 21 to the mixing tank 1, the process thereafter being carried out as above set forth.

Under some circumstances it may be desirable to pass the distilled ammonium bicarbonate from the heater 21 into the solution of barium chlorid in the tank 1. For this purpose the valve 23 will be closed and the valve 24 will be opened and the ammonium bicarbonate in the vapor phase will be conducted by conduit 25 to the bottom of the tank 1. The solution may be agitated mechanically at the same time, and the reaction by which barium carbonate is precipitated will proceed, the precipitate being removed and the resulting liquor being treated in the manner previously set forth.

It is manifest that by closing the valves 19, 24 and 28, and by opening the valves 20, 23 and 27, so much of the operation as relates to the production of barium carbonate will be discontinued.

I claim:

1. The method of making barium carbonate, which comprises converting the ammonium bicarbonate content of the feeder liquor of the ammonia soda process into barium carbonate by reaction with a solution of barium chlorid, separating the barium carbonate from the solution, reacting upon the resultant solution with barium sulfid to form barium chlorid, and utilizing the barium chlorid so produced in additional conversion of ammonium bicarbonate into barium carbonate.

2. The method of making barium carbonate, which comprises utilizing the feeder liquor of the ammonia soda process and barium chlorid as the starting materials for the production of a precipitate of barium carbonate in a solution containing ammonium chlorid, separating the barium carbonate from the solution, and utilizing this solution and barium sulfid for the production of barium chlorid to be used in the first reaction.

3. The method of making barium carbonate, which comprises utilizing a solution of the black ash of barytes and the ammonium chlorid of the feeder liquor coming from the bicarbonate filters of the ammonia soda process as the starting materials for the production of barium chlorid, and utilizing the barium chlorid and further feeder liquor for the production of ammonium chlorid, to be used in the production of further barium chlorid, and barium carbonate.

In witness whereof, I hereunto subscribe my signature.

JAMES H. MacMAHON.